US012627328B2

(12) United States Patent
Winiecki et al.

(10) Patent No.: US 12,627,328 B2
(45) Date of Patent: May 12, 2026

(54) SHARED TRANSMITTER FOR CELLULAR ACCESS AND WIRELESS CHARGING

(71) Applicant: Sequans Communications SA, Colombes (FR)

(72) Inventors: Thomas Winiecki, Reading (GB); Nick Taluja, Dallas, TX (US); Jeremy Gosteau, Paris (FR)

(73) Assignee: Sequans Communications SA, Colombes (FR)

( * ) Notice: Subject to any disclaimer, the term of this patent is extended or adjusted under 35 U.S.C. 154(b) by 893 days.

(21) Appl. No.: 17/901,679

(22) Filed: Sep. 1, 2022

(65) Prior Publication Data

US 2024/0080059 A1 Mar. 7, 2024

(51) Int. Cl.
H04B 1/40 (2015.01)
H02J 50/20 (2016.01)
H04B 1/04 (2006.01)

(52) U.S. Cl.
CPC ................ H04B 1/40 (2013.01); H02J 50/20 (2016.02); H04B 1/0483 (2013.01)

(58) Field of Classification Search
CPC .......... H04B 1/40; H04B 1/0483; H02J 50/20
USPC .......................................................... 455/573
See application file for complete search history.

(56) References Cited

U.S. PATENT DOCUMENTS 8,644,771 B1 * 2/2014 Delker .................. H04W 52/48
455/574
9,979,230 B2 * 5/2018 Cook ...................... H02J 50/12

10,038,332 B1 * 7/2018 Leabman .................. H02J 7/04
11,929,628 B2 * 3/2024 Tong ...................... H01Q 1/248
12,184,418 B2 * 12/2024 Palgy .................... H04L 1/1819
2009/0275282 A1 * 11/2009 LeVan .................... H04B 5/266
455/41.1
2015/0180266 A1 * 6/2015 Mcfarthing ............... H02J 7/00
320/108
2015/0195014 A1 * 7/2015 Koshy .............. H04W 52/0229
455/41.1
2016/0118836 A1 * 4/2016 Waldschmidt ......... H01Q 9/285
320/108
2017/0098951 A1 * 4/2017 Olgun ..................... H02J 50/12
2017/0237301 A1 * 8/2017 Elad ........................ H02J 50/80
307/104
2020/0229206 A1 * 7/2020 Badic ................ H04W 28/0226
(Continued)

*Primary Examiner* — April G Gonzales
(74) *Attorney, Agent, or Firm* — ONE LLP

(57) ABSTRACT

Some embodiments relate to systems and methods for communication of electronic signals using a communication device. The communication device includes a first transmitter, a second transmitter, a first antenna, coupled to the first transmitter, a second antenna, coupled to the second transmitter, a memory, and a processor, coupled to the memory, the first transmitter, and the second transmitter. The memory includes instructions that, when executed by the processor cause the processor to generate a long-range communication signal, generate a short-range communication signal, transmit the long-range communication signal from the first transmitter over the first antenna, transmit the short-range communication signal from a second transmitter over the second antenna, generate a charging signal, and transmit the charging signal from at least one of the first transmitter over the first antenna and the second transmitter over the second antenna.

17 Claims, 6 Drawing Sheets

(56)           References Cited

U.S. PATENT DOCUMENTS

| | | | |
|---|---|---|---|
| 2020/0244106 A1* | 7/2020 | An | H02J 50/10 |
| 2021/0257859 A1* | 8/2021 | Lee | H02J 50/12 |

* cited by examiner

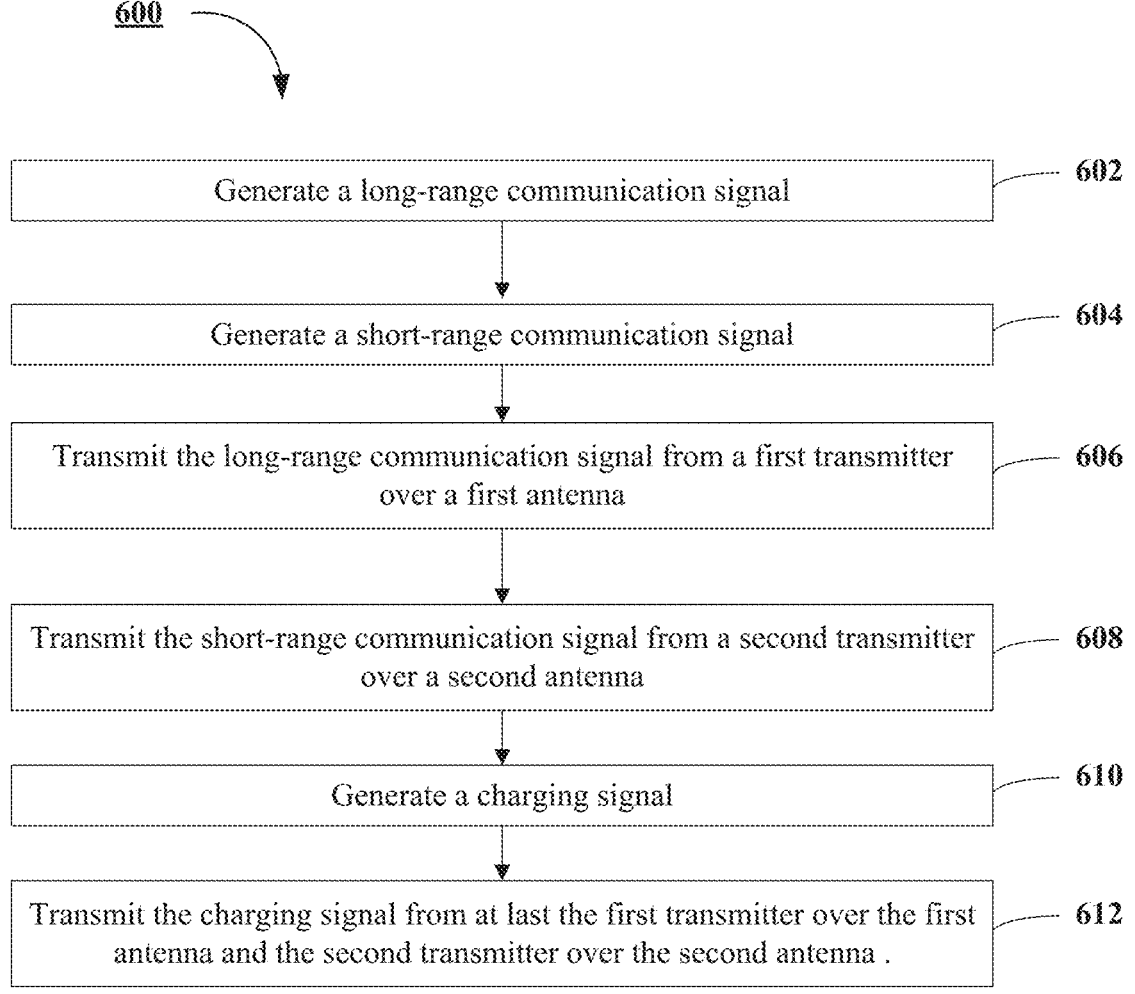

600

Generate a long-range communication signal — 602

Generate a short-range communication signal — 604

Transmit the long-range communication signal from a first transmitter over a first antenna — 606

Transmit the short-range communication signal from a second transmitter over a second antenna — 608

Generate a charging signal — 610

Transmit the charging signal from at last the first transmitter over the first antenna and the second transmitter over the second antenna . — 612

FIG. 6

SHARED TRANSMITTER FOR CELLULAR ACCESS AND WIRELESS CHARGING

TECHNICAL FIELD

The disclosure relates generally to the field of wireless communications, more specifically and not by way of limitation, some embodiments are related to shared circuitry within communication devices.

BACKGROUND OF THE INVENTION

Wireless charging (also known as cordless or inductive charging) may be a process of transferring power between electronic devices using electromagnetic coupling. A transmitter may be powered from a mains power line or other power source. The transmitter may generate radio waves that may be picked up by a receiving device and converted to a direct current (DC) in order to charge a battery, supercapacitor, or other suitable charge storage device.

For receiving devices that consume very little power, e.g., on the order of a few milliwatts or lower, the process may often be described as "energy harvesting." Even minute levels of incident radio frequency (RF) signals may be converted to useful power. Devices that successfully extract energy from surrounding electromagnetic waves may continuously charge themselves and devices using these signals for charging may not need the device's batteries replaced at regular intervals.

Wireless charging may be limited to relatively modest physical distances. For example, FCC rules limit the power from cellular handheld devices for personal use to 23 dBm (200 mW), which is considered safe by medical and biological experts. When this power is transmitted using an omnidirectional antenna, the power will drop by around 33 dB (assuming 1 GHz carrier frequency) or a factor of 2,000 over a distance of just 1 meter. An energy harvesting device at this distance will only receive 100 µW of RF signal level and more power will be lost in the conversion to usable DC power. Directional antennas and the use of lower carrier frequencies may improve the energy transfer but generally wireless power transfer in a home environment may be limited to a few meters of distance.

While low frequencies (e.g., a few hundreds of kHz) may work best for wireless charging, energy harvesting often target higher frequencies, where short-range communication and longer-range communication equipment operates. Examples include, but are not limited to the 800 MHz, 900 MHz, and 2.4 GHz ISM bands.

Another recent trend is often described as the connected home. The connect home may use a number of small devices that sense and control various aspects around people's homes. The number of small devices may be sensors for light, humidity or temperature, cameras and intruder alarms or controlling devices for heating, lighting or similar devices. Communication between the devices may often be based on Bluetooth, WiFi, or similar short-range technologies. Many of these devices may need to be mains powered (e.g., surveillance cameras), but some simpler sensors may be battery powered and may use energy harvesting. In many cases, the messages from simple sensors may be aggregated by a hub device that may have a connection with the internet via a cellular link. This cellular link may use low throughput standards such as LTE NB-IoT, Category M1 or NR Red-Cap, eRedCap or any future cellular technology.

Multiple connected sensors may also be deployed in industrial environments, for example on manufacturing lines or laboratories. For these cases, wireless charging is also attractive as it allows flexible placement without the necessary cabling.

SUMMARY OF THE INVENTION

Some embodiments relate to systems and methods for a communication device. The communication device includes a first transmitter, a second transmitter, a first antenna, coupled to the first transmitter, a second antenna, coupled to the second transmitter, a memory, and a processor, coupled to the memory, the first transmitter, and the second transmitter. The memory includes instructions that, when executed by the processor cause the processor to generate a long-range communication signal, generate a short-range communication signal, transmit the long-range communication signal from the first transmitter over the first antenna, transmit the short-range communication signal from the second transmitter over the second antenna, generate a charging signal, and transmit the charging signal from at least one of the first transmitter over the first antenna and the second transmitter over the second antenna.

Some embodiments relate to systems and methods for a communication system. The communication device includes a first transmitter, a second transmitter, a first antenna, coupled to the first transmitter, a second antenna, coupled to the second transmitter, a memory, and a processor, coupled to the memory, the first transmitter, and the second transmitter. The memory includes instructions that, when executed by the processor cause the processor to generate a long-range communication signal, generate a short-range communication signal, transmit the long-range communication signal from the first transmitter over the first antenna, transmit the short-range communication signal from the second transmitter over the second antenna, generate a charging signal, and transmit the charging signal from the first transmitter over the first antenna and the second transmitter over the second antenna. The communication system includes a sensor coupled to the communication device through at least one of the first transmitter and the second transmitter using at least one of the communication signal or the charging signal.

Some embodiments relate to systems and methods for a method of communication of electronic signals and charging. The example method includes generating a long-range communication signal and generating a short-range communication signal. The example method includes transmitting the long-range communication signal from the first transmitter over the first antenna and transmitting the short-range communication signal from the second transmitter over the second antenna. The method also includes generating a charging signal and transmitting the charging signal from at least one of the first transmitter over the first antenna and the second transmitter over the second antenna.

BRIEF DESCRIPTION OF THE DRAWINGS

The present invention may be better understood by referring to the following figures. The components in the figures are not necessarily to scale. Emphasis instead being placed upon illustrating the principles of the disclosure. In the figures, reference numerals designate corresponding parts throughout the different views.

FIG. 6 is a flowchart illustrating an example method in accordance with the systems and methods described herein.

Figure 1:
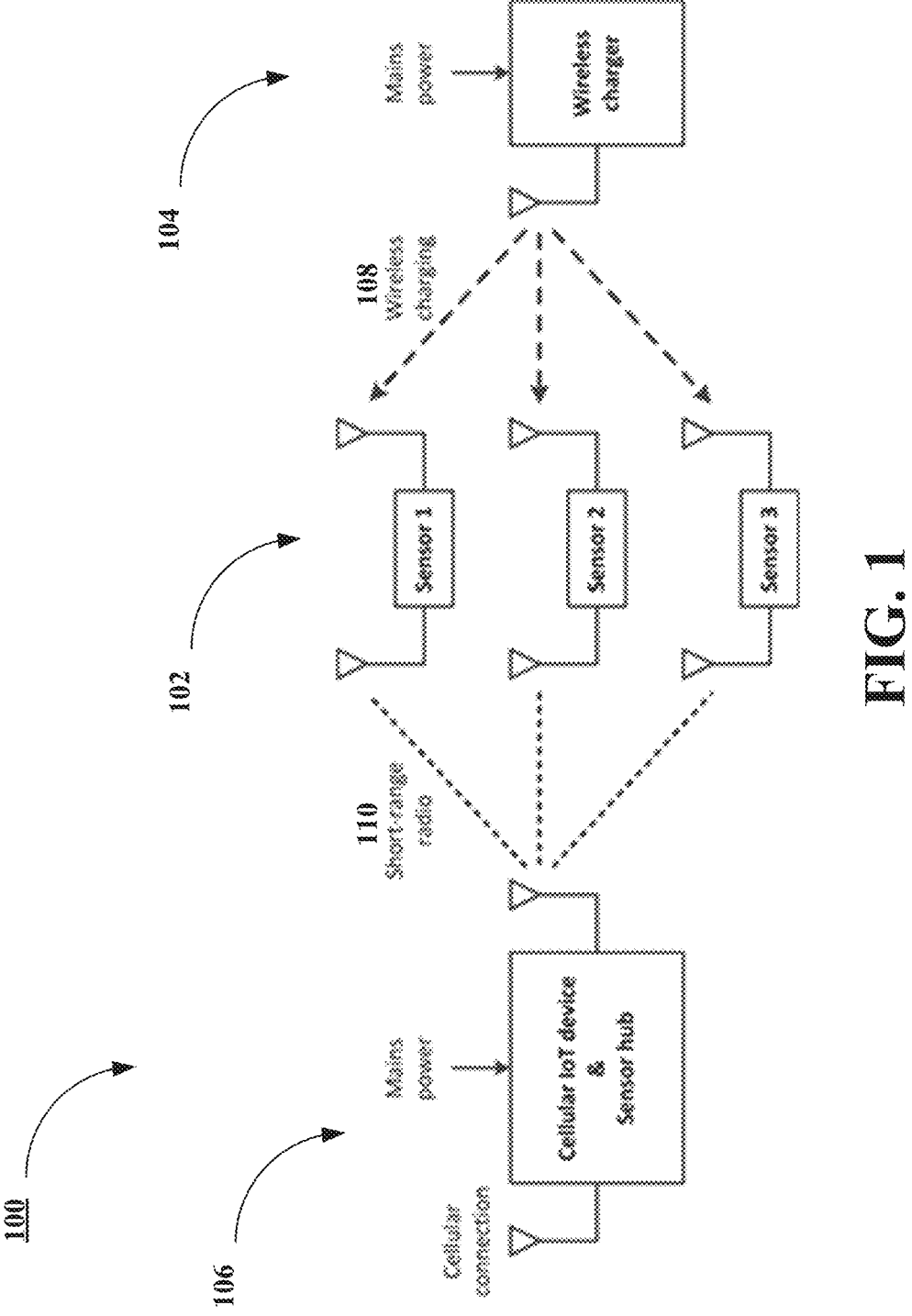
FIG. 1 is a diagram illustrating a typical arrangement of sensors in a connected home.

The figures and the following description describe certain embodiments by way of illustration only. One skilled in the art will readily recognize from the following description that alternative embodiments of the structures and methods illustrated herein may be employed without departing from the principles described herein. Reference will now be made in detail to several embodiments, examples of which are illustrated in the accompanying figures. It is noted that wherever practicable similar or like reference numbers may be used in the figures to indicate similar or like functionality.

DETAILED DESCRIPTION

The detailed description set forth below in connection with the appended drawings is intended as a description of configurations and is not intended to represent the only configurations in which the concepts described herein may be practiced. The detailed description includes specific details for the purpose of providing a thorough understanding of various concepts. However, it will be apparent to those skilled in the art that these concepts may be practiced without these specific details. In some instances, well known structures and components are shown in block diagram form in order to avoid obscuring such concepts.

Several aspects of shared circuitry within communication devices will now be presented with reference to various apparatus and methods. These apparatus and methods will be described in the following detailed description and illustrated in the accompanying drawings by various blocks, components, circuits, processes, algorithms, etc. (collectively referred to as "elements"). These elements may be implemented using electronic hardware, computer software, or any combination thereof. Whether such elements are implemented as hardware or software depends upon the particular application and design constraints imposed on the overall system.

By way of example, an element, or any portion of an element, or any combination of elements may be implemented as a "processing system" that includes one or more processors. Examples of processors include microprocessors, microcontrollers, graphics processing units (GPUs), central processing units (CPUs), application processors, digital signal processors (DSPs), reduced instruction set computing (RISC) processors, systems on a chip (SoC), baseband processors, field programmable gate arrays (FPGAs), programmable logic devices (PLDs), state machines, gated logic, discrete hardware circuits, and other suitable hardware configured to perform the various functionality described throughout this disclosure. One or more processors in the processing system may execute software. Software shall be construed broadly to mean instructions, instruction sets, code, code segments, program code, programs, subprograms, software components, applications, software applications, software packages, routines, subroutines, objects, executables, threads of execution, procedures, functions, etc., whether referred to as software, firmware, middleware, microcode, hardware description language, or otherwise.

Accordingly, in one or more example embodiments, the functions described may be implemented in hardware, software, or any combination thereof. If implemented in software, the functions may be stored on or encoded as one or more instructions or code on a computer-readable medium. Computer-readable media includes computer storage media. Storage media may be any available media that can be accessed by a computer. By way of example, and not limitation, such computer-readable media can comprise a random-access memory (RAM), a read-only memory (ROM), an electrically erasable programmable ROM (EEPROM), optical disk storage, magnetic disk storage, other magnetic storage devices, combinations of the aforementioned types of computer-readable media, or any other medium that can be used to store computer executable code in the form of instructions or data structures that can be accessed by a computer.

FIG. 1 is a diagram illustrating a typical arrangement 100 of sensors 102 in a connected home. With wireless charging 108, short-range communication (e.g., over a short-range radio 110) between a sensor hub 104 and wireless charging 106 may be implemented by dedicated and separate devices. A typical arrangement is illustrated in FIG. 1. A sensor hub 104 device may communicate with several sensors 102 in a home or industrial environment using short-range communication. The sensor hub 104 may bundle the information and relay the information to the internet via a cellular connection. In parallel, a dedicated wireless charging device may provide RF power to the sensors 102 that the sensors 102 convert and accumulate to usable charge storage.

Figure 2:
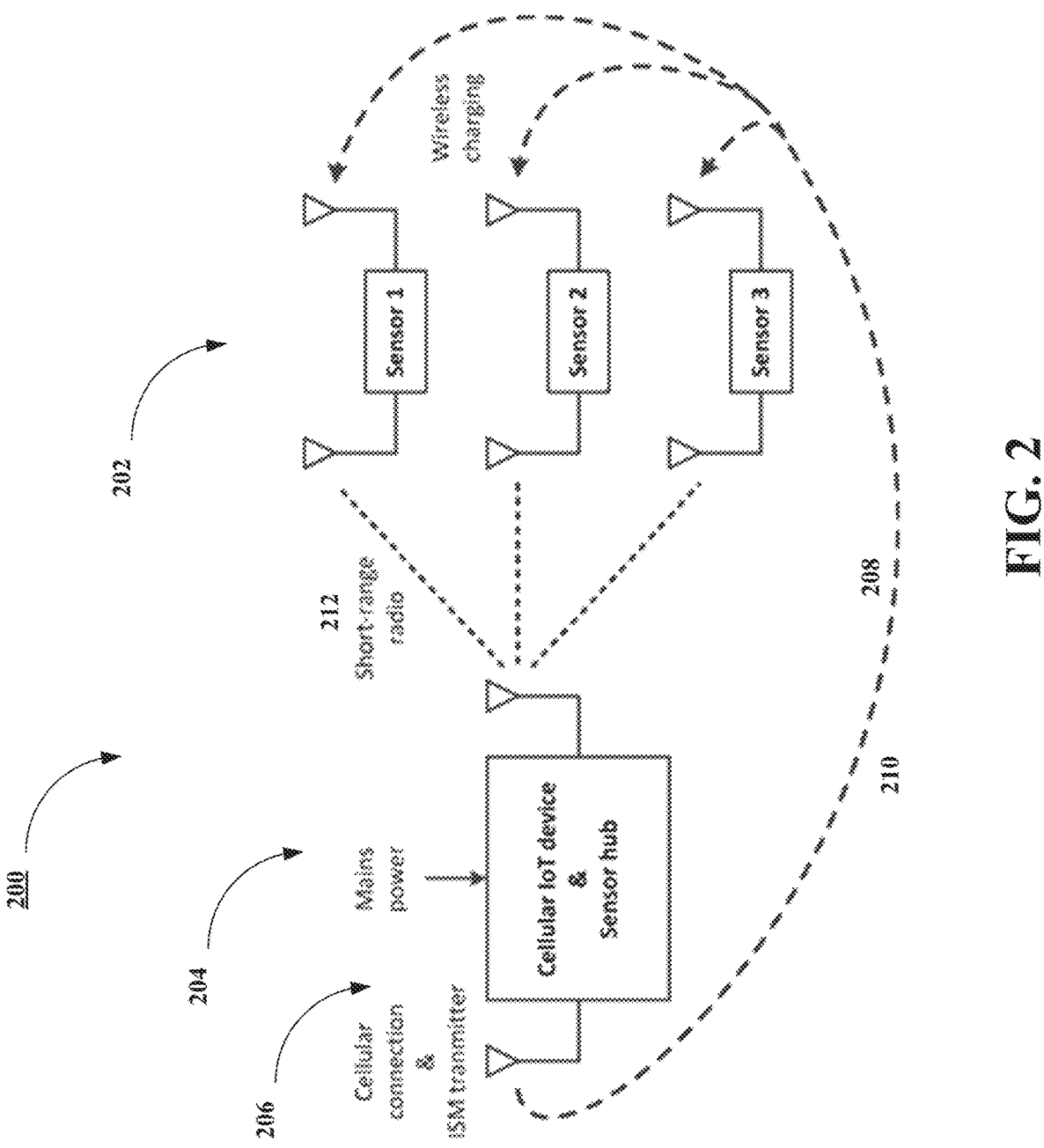
FIG. 2 is a diagram illustrating a modified scheme with cellular charge harvesting devices in accordance with the systems and methods described herein.

FIG. 2 is a diagram illustrating an example of a modified scheme 200 with cellular charge harvesting devices 202 (e.g., sensors) in accordance with the systems and methods described herein. Some embodiments of the systems and methods described herein may remove the need for a dedicated charging device and instead use the transmitter of the cellular radio to opportunistically provide RF power 208 to the sensors 202. Some embodiments may use a transmit system 206 of the cellular radio (and/or an industrial, scientific, and medical (ISM) transmitter) of an electronic device 204 to provide RF power 208 to remote sensor 202 devices 202 whenever the RF power is not used for communication with the network, e.g., long-range communication 210.

In FIG. 2, a single transmit chain, that is a single PA and/or singe physical antenna, may be used to either transmit cellular signals and receive cellular signals during time periods as required to comply with the cellular protocol needs, or to transmit a different signal at a different carrier frequency during time periods when no reception or transmission is required over the cellular network.

Figure 3:
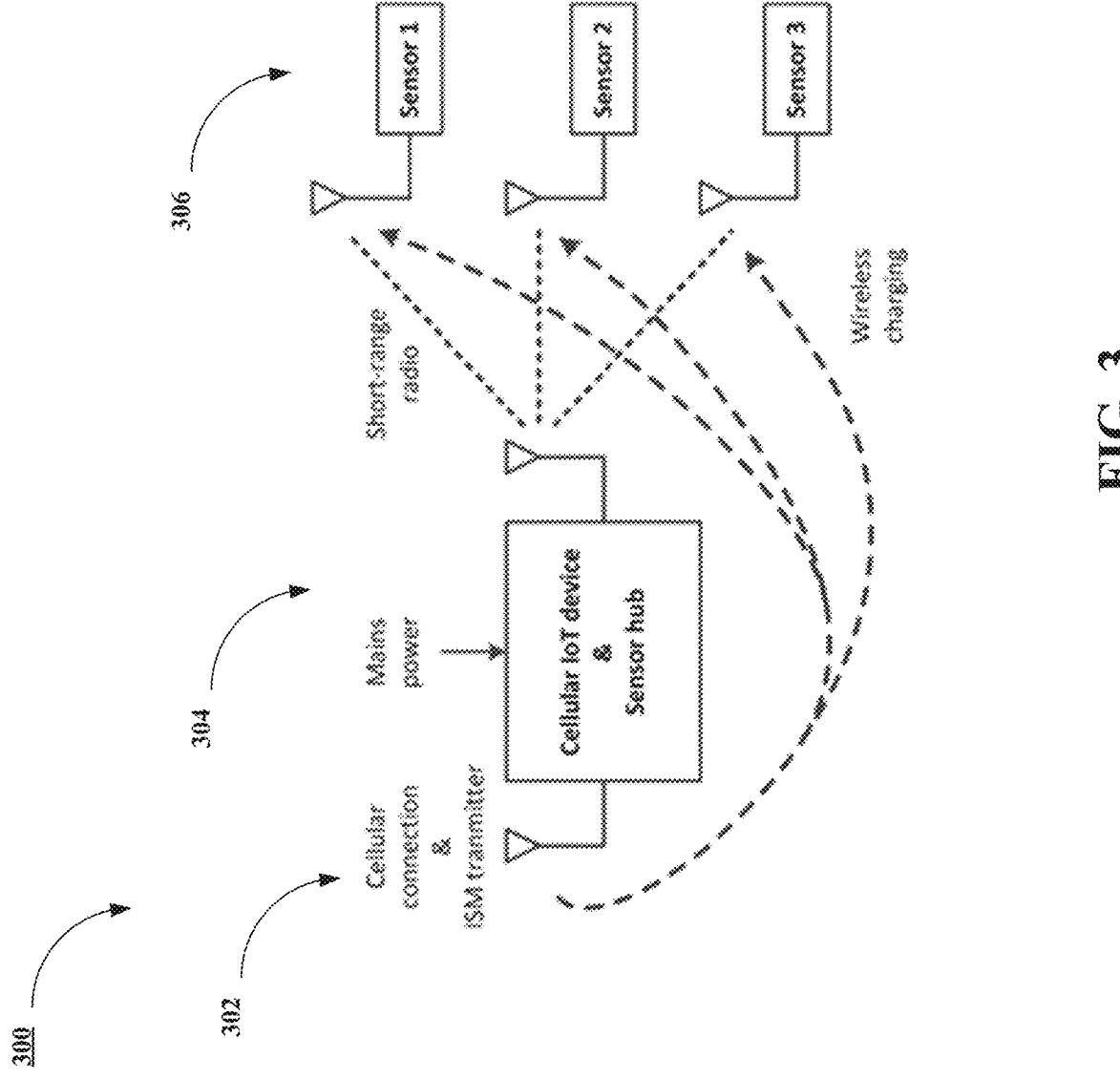
FIG. 3 is a diagram illustrating a similar scheme to FIG. 2 with shared antenna for charging and short-range radio in accordance with the systems and methods described herein.

The sensor design may, in practice, also use a shared antenna for wireless charging and short-range communications 212. Such a scenario is illustrated in FIG. 3. FIG. 3 is a diagram illustrating a similar scheme 300 to FIG. 2 with shared antenna 302 for charging and short-range radio in accordance with the systems and methods described herein. When wireless charging uses a very different frequency (e.g., 915 MHz) from the short-range radio (e.g., 2.5 GHz), then a diplexer or similar filtering solution may be used to split these frequencies and enable concurrent operation.

When the cellular modem is required and scheduled by the network to exchange information or listen for a paging message, the transmitter or receiver may be tuned to cellular band frequencies and the transmit power is configured to the level requested by the base station. However, when no communication with the base station is scheduled, the transmit chain may be tuned to an unlicensed band (e.g., the 915 MHz ISM band) and the power may be configured to the maximum allowed level.

Transmissions may be strictly regulated in terms of power and spectral properties. These regulations may depend on the frequency band and local regulatory limits. For example, in the 915 MHz band in the US, transmit signals may stay below 30 dBm and may be spread to a width of at least 100 kHz. Emissions outside the ISM band may be below certain limits set by FCC. Therefore, when the transmitter provides power to charge nearby harvesting devices, the transmit signal may be prepared according to the corresponding rules.

The following explains how the time-sharing between cellular access and wireless charging may be implemented for cellular IoT devices 304. Even though they operate in distinct frequency bands, the cellular transmitter is usually wide-band and may access a wide range of frequencies. That means the transmitter may be configured to and switched between licensed cellular frequencies and unlicensed frequencies suitable for wireless charging.

The LTE IoT standards (NB-IoT and Category M1/M2) have several modes of operation designed for power saving that offer long durations where no cellular access is required. The modes of operation designed for power saving may be known as extended Discontinuous Reception (eDRX) and Power Saving Mode (PSM). In eDRX, the device may wake up periodically to check for paging messages. When pages (e.g., the network wants to initiate communication with the device), the device wakes up and receives information from the network. If no paging message is received, the device may go back to sleep for relatively long durations (typically, but not limited to 5.12 s to 81.92 s). These long sleep durations may allow for transmitting RF power for device charging. The PSM mode extends the sleep duration to even longer times. The device may not be expected to listen to paging messages and may go to sleep for many hours or even days.

The communication system illustrated in FIGS. 2-3 may include a communication device, e.g., electronic device 204. The communication device, e.g., electronic device 204 may include a transmitter. Additionally, the communication device may include a long-range antenna, coupled to the transmitter, and a short-range antenna, coupled to the transmitter. The communication device, e.g., electronic device 204 may include a memory and a processor, coupled to the memory and the transmitter. The memory may include instructions that, when executed by the processor cause the processor to generate a long-range communication signal, generate a short-range communication signal, transmit the long-range communication signal from the transmitter over an the long-range antenna, transmit the short-range communication signal from the transmitter over the short-range antenna, generate a charging signal, and transmit the charging signal from the transmitter over at least one of the long-range antenna and the short-range antenna. The communication system illustrated in FIGS. 2-3 may also include a sensor coupled to the communication device through the transmitter using at least one of the communication signals or the charging signal.

FIGS. 2-3 provide an example embodiment using cellular signals. It will be understood that many other types of long-range signals may be used. Many types of long-range signals may be used in various example embodiments. Additionally, many types of short-range signals may be used in various example embodiments. Furthermore, "long-range" and "short-range" are generally used to differentiate between two communication signals (two types of communications signals in some example embodiments). These signals may have a first signal that may have a longer range than a second signal. However, in some embodiments, this may not be the case. The long-range signal and the short-range signal may have similar ranges. In some example embodiments, the long-range signal and the short-range signal may both be the same type of signal, e.g., cellular signals or any other appropriate communications signals.

Furthermore, the same may be true for the long-range antenna and the short-range antenna. The terms "long-range antenna" and "short-range antenna" may generally be used to differentiate between two antennas (two types of antennas in some example embodiments). These antennas may have a first antenna that may have a longer range than a second antenna. However, in some embodiments, this may not be the case. The long-range antenna and the short-range antenna may have similar ranges or the same ranges, e.g., for a given transmit power. In some embodiments, the same types of antennas may be used.

Figure 4:
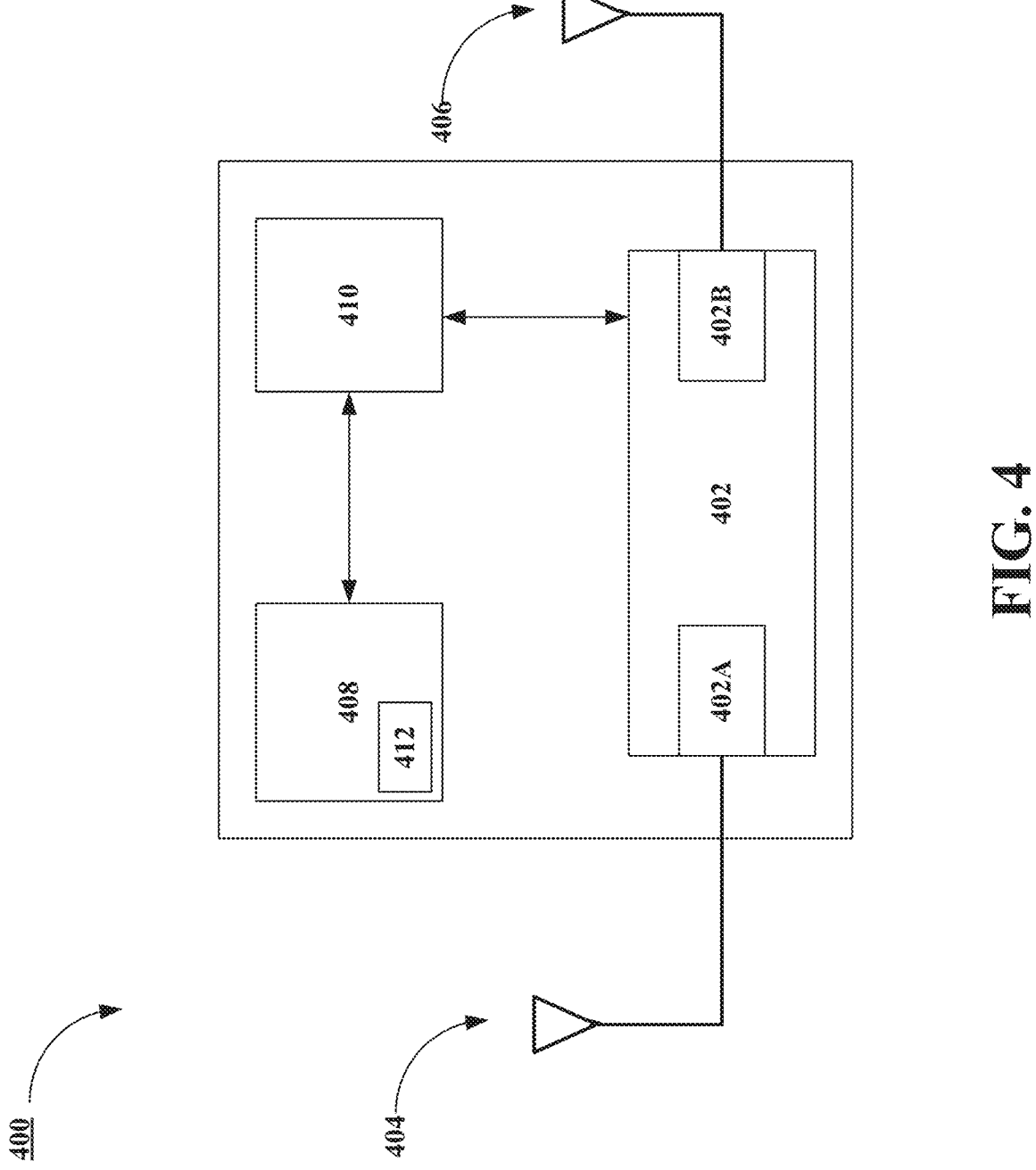
FIG. 4 is a diagram illustrating a communication device, e.g., an electronic device, in accordance with the systems and methods described herein.

FIG. 4 is a diagram illustrating a communication device 400, e.g., an electronic device 204, in accordance with the systems and methods described herein. The communication device 400 may include a transmission block 402, e.g., made up of a first transmitter 402A and a second transmitter 402B. Additionally, the communication device 400 may include a first antenna 404, coupled to the first transmitter 402A, and a second antenna 406, coupled to the second transmitter 402B. The communication device 400 may include a memory 408 and a processor 410, coupled to the memory 408 and the transmitter 402. The memory 408 may include instructions 412 that, when executed by the processor 410 cause the processor 410 to generate a long-range communication signal (208), generate a short-range communication signal (210), transmit the long-range communication signal (208) from a the first transmitter 402A over an the second antenna 404, transmit the short-range communication signal (210) from the second transmitter 402B over the second antenna 406, generate a charging signal, and transmit the charging signal from at least one of the first transmitter over the first antenna 404 and the second transmitter over the second antenna 406. The communication system illustrated in FIGS. 2-3 may also include a sensor coupled to the communication device through the transmitter using at least one of the communication signals or the charging signal.

In an example embodiment, the first transmitter may be a cellular transmitter.

In an example embodiment, the sensor may be coupled to the communication device through the transmitter using the communication signal. The communication signal may provide data communication between the sensor and the communication device.

In an example embodiment, the sensor may be coupled to the communication device through the charging signal. The charging signal may provide energy to the sensor. The sensor may convert the energy provided by the charging signal to a direct current (DC) charging voltage.

In an example embodiment, the transmitter may alternate between transmitting the charging signal and at least one of the long-range communication signal and the short range communication signal. In an example embodiment, the charging signal may be transmitted during idle periods of at least one of the long-range communication signal and the short range communication signal. In an example embodiment, the charging signal may be transmitted during idle periods of the long-range communication signal.

Figure 5:
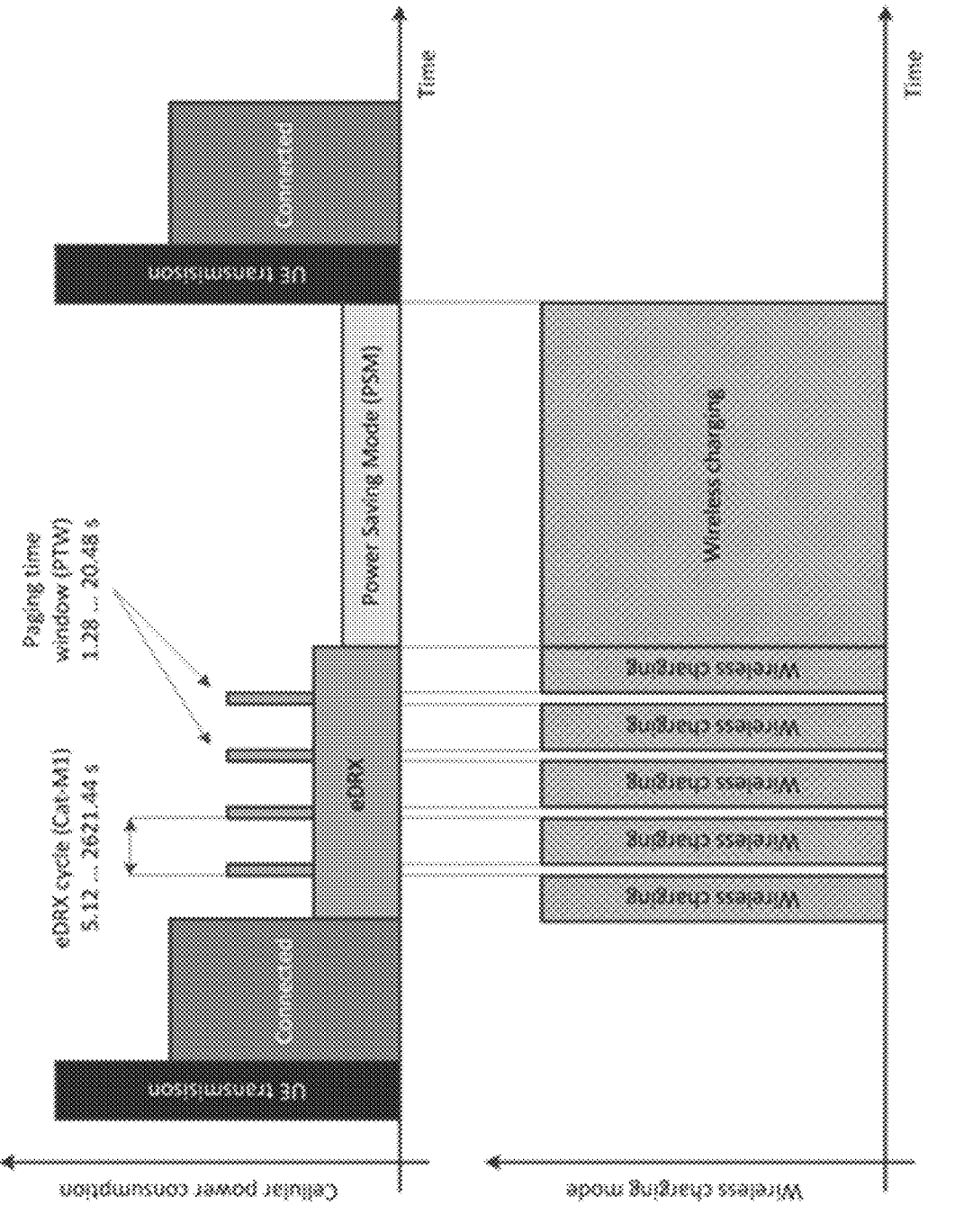
FIG. 5 is a diagram illustrating the alignment of charging mode with cellular idle periods in accordance with the systems and methods described herein.

FIG. 5 is a diagram illustrating an example alignment of charging mode with cellular idle periods in accordance with the systems and methods described herein. The figure illustrates how the device's behavior may be modified to switch between LTE cellular and charging functionality. For example, the diagram illustrates how the wireless charging mode may be aligned with idle periods during eDRX and PSM modes that may be scheduled by a base station and managed by the cellular modem device. Instead of the device going to sleep during these periods (as would be expected from a standard cellular IoT device), the transmitter may be configured to output maximum power in the band used for charging. When the cellular modem is active, wireless charging is suspended.

Note that there may be finite re-configuration times when switching between cellular and charger modes. For example, if a PLL needs to be re-tuned to change frequency band between the licensed cellular and the unlicensed band used for charging, then this re-tuning must be initiated early enough so the device is ready to receive and transmit cellular signal when required. This very slightly shortens the times available for charging.

Wireless charging may also be enabled during shorter idle durations (e.g., 1.28 second, 2.56 second configurations) or even during any inactive time subframe (1 ms duration) but this may be of little benefit. For future 5G RedCap implementations, periodic sleep cycles similar to eDRX and PSM may be defined where the device knows at what time no cellular access is required. Therefore, it will again be possible to enable wireless charging mode during these time intervals.

Another important aspect is that the regulations governing wireless charging may differ from country to country. For example, in the US wireless charging in the 900 MHz ISM band is permitted up to a power of 30 dBm. In other countries, this band may not be used but instead another band could be used (e.g., 800 MHz ISM band). The cellular transceiver can establish what region it is operating in by checking the available cellular networks. If no cellular connection can be established that is known to be in a region that permits wireless charging, this functionality may be disabled. In that case, the IoT device may enter sleep mode during eDRX or PSM Idle periods. When the region is established through a recognized wireless network, wireless charging may be enabled in the band that is most suitable for the detected region.

In some embodiments, the method described herein may allow a single transmitter to be used for cellular communication as well as for wirelessly charging devices. Using a single transmitter for cellular communication as well as for wirelessly charging of devices may save cost and simplify the setup of typical connected home or industrial multi-sensor configurations. Other embodiments may allow multiple transmitters to each be used for cellular communication and for wirelessly charging devices.

FIG. 6 is a flowchart illustrating an example method 600 in accordance with the systems and methods described herein. The example method 600 may be a method of communication of electronic signals and charging. The method 600 includes generating a long-range communication signal (602), generating a short-range communication signal (604), transmitting the long-range communication signal from a first transmitter over a first antenna (606), transmitting the short-range communication signal from a second transmitter over a second antenna (608), generating a charging signal (610), and transmitting the charging signal from at least one of the first transmitter over the first antenna and the second transmitter over the second antenna (612).

In an example embodiment, the transmitter may be a short-range transmitter. The transmitter may be a long-range transmitter. The long-range transmitter may be a cellular transmitter. The transmitter may be multiple transmitters. For example, the transmitter may be a long-range transmitter and a short-range transmitter.

In an example embodiment, the transmitter may alternate between transmitting the charging signal and at least one of the long-range communication signal and the short range communication signal. In an example embodiment, the charging signal may be transmitted during idle periods of at least one of the long-range communication signal and the short range communication signal. In an example embodiment, the charging signal may be transmitted during idle periods of the long-range communication signal.

The words used in this specification to describe the instant embodiments are to be understood not only in the sense of their commonly defined meanings, but to include by special definition in this specification: structure, material or acts beyond the scope of the commonly defined meanings. Thus, if an element can be understood in the context of this specification as including more than one meaning, then its use may be understood as being generic to all possible meanings supported by the specification and by the word or words describing the element.

The definitions of the words or drawing elements described above are meant to include not only the combination of elements which are literally set forth, but all equivalent structure, material or acts for performing substantially the same function in substantially the same way to obtain substantially the same result. In this sense it is therefore contemplated that an equivalent substitution of two or more elements may be made for any one of the elements described and its various embodiments or that a single element may be substituted for two or more elements in a claim.

Changes from the claimed subject matter as viewed by a person with ordinary skill in the art, now known or later devised, are expressly contemplated as being equivalents within the scope intended and its various embodiments. Therefore, obvious substitutions now or later known to one with ordinary skill in the art are defined to be within the scope of the defined elements. This disclosure is thus meant to be understood to include what is specifically illustrated and described above, what is conceptually equivalent, what can be obviously substituted, and also what incorporates the essential ideas.

In the foregoing description and in the figures, like elements are identified with like reference numerals. The use of "e.g.," "etc," and "or" indicates non-exclusive alternatives without limitation, unless otherwise noted. The use of "including" or "includes" means "including, but not limited to," or "includes, but not limited to," unless otherwise noted.

As used above, the term "and/or" placed between a first entity and a second entity means one of (1) the first entity, (2) the second entity, and (3) the first entity and the second entity. Multiple entities listed with "and/or" should be construed in the same manner, i.e., "one or more" of the entities so conjoined. Other entities may optionally be present other than the entities specifically identified by the "and/or"

clause, whether related or unrelated to those entities specifically identified. Thus, as a non-limiting example, a reference to "A and/or B", when used in conjunction with open-ended language such as "comprising" can refer, in one embodiment, to A only (optionally including entities other than B); in another embodiment, to B only (optionally including entities other than A); in yet another embodiment, to both A and B (optionally including other entities). These entities may refer to elements, actions, structures, processes, operations, values, and the like.

One or more of the components, steps, features, and/or functions illustrated in the figures may be rearranged and/or combined into a single component, block, feature or function or embodied in several components, steps, or functions. Additional elements, components, steps, and/or functions may also be added without departing from the disclosure. The apparatus, devices, and/or components illustrated in the Figures may be configured to perform one or more of the methods, features, or steps described in the Figures. The algorithms described herein may also be efficiently implemented in software and/or embedded in hardware.

Reference in the specification to "one embodiment" or "an embodiment" means that a particular feature, structure, or characteristic described in connection with the embodiment is included in at least one embodiment of the invention. The appearances of the phrase "in one embodiment" in various places in the specification are not necessarily all referring to the same embodiment.

Some portions of the detailed description are presented in terms of algorithms and symbolic representations of operations on data bits within a computer memory. These algorithmic descriptions and representations are the methods used by those skilled in the data processing arts to most effectively convey the substance of their work to others skilled in the art. An algorithm is here, and generally, conceived to be a self-consistent sequence of steps leading to a desired result. The steps are those requiring physical manipulations of physical quantities. Usually, though not necessarily, these quantities take the form of electrical or magnetic signals capable of being stored, transferred, combined, compared or otherwise manipulated. It has proven convenient at times, principally for reasons of common usage, to refer to these signals as bits, values, elements, symbols, characters, terms, numbers or the like.

It should be borne in mind, however, that all of these and similar terms are to be associated with the appropriate physical quantities and are merely convenient labels applied to these quantities. Unless specifically stated otherwise as apparent from the following disclosure, it is appreciated that throughout the disclosure terms such as "processing," "computing," "calculating," "determining," "displaying" or the like, refer to the action and processes of a computer system, or similar electronic computing device, that manipulates and transforms data represented as physical (electronic) quantities within the computer system's registers and memories into other data similarly represented as physical quantities within the computer system's memories or registers or other such information storage, transmission or display.

Finally, the algorithms and displays presented herein are not inherently related to any particular computer or other apparatus. Various general-purpose systems may be used with programs in accordance with the teachings herein, or it may prove convenient to construct more specialized apparatus to perform the required method steps. The required structure for a variety of these systems will appear from the description below. It will be appreciated that a variety of programming languages may be used to implement the teachings of the invention as described herein.

The figures and the description describe certain embodiments by way of illustration only. One skilled in the art will readily recognize from the following description that alternative embodiments of the structures and methods illustrated herein may be employed without departing from the principles described herein. Reference will now be made in detail to several embodiments, examples of which are illustrated in the accompanying figures. It is noted that wherever practicable similar or like reference numbers may be used in the figures to indicate similar or like functionality.

The foregoing description of the embodiments of the present invention has been presented for the purposes of illustration and description. It is not intended to be exhaustive or to limit the present invention to the precise form disclosed. Many modifications and variations are possible in light of the above teaching. It is intended that the scope of the present invention be limited not by this detailed description, but rather by the claims of this application. As will be understood by those familiar with the art, the present invention may be embodied in other specific forms without departing from the spirit or essential characteristics thereof. Likewise, the particular naming and division of the modules, routines, features, attributes, methodologies and other aspects are not mandatory or significant, and the mechanisms that implement the present invention or its features may have different names, divisions and/or formats.

Furthermore, as will be apparent to one of ordinary skill in the relevant art, the modules, routines, features, attributes, methodologies and other aspects of the present invention can be implemented as software, hardware, firmware or any combination of the three. Also, wherever a component, an example of which is a module, of the present invention is implemented as software, the component can be implemented as a standalone program, as part of a larger program, as a plurality of separate programs, as a statically or dynamically linked library, as a kernel loadable module, as a device driver, and/or in every and any other way known now or in the future to those of ordinary skill in the art of computer programming.

Additionally, the present invention is in no way limited to implementation in any specific programming language, or for any specific operating system or environment. Accordingly, the disclosure of the present invention is intended to be illustrative, but not limiting, of the scope of the present invention, which is set forth in the following claims.

It is understood that the specific order or hierarchy of blocks in the processes/flowcharts disclosed is an illustration of example approaches. Based upon design preferences, it is understood that the specific order or hierarchy of blocks in the processes/flowcharts may be rearranged. Further, some blocks may be combined or omitted. The accompanying method claims present elements of the various blocks in a sample order and are not meant to be limited to the specific order or hierarchy presented.

The previous description is provided to enable any person skilled in the art to practice the various aspects described herein. Various modifications to these aspects will be readily apparent to those skilled in the art, and the generic principles defined herein may be applied to other aspects. Thus, the claims are not intended to be limited to the aspects shown herein, but are to be accorded the full scope consistent with the language claims, wherein reference to an element in the singular is not intended to mean "one and only one" unless specifically so stated, but rather "one or more." The word "exemplary" is used herein to mean "serving as an example, instance, or illustration." Any aspect described herein as "exemplary" is not necessarily to be construed as preferred or advantageous over other aspects. Unless specifically stated otherwise, the term "some" refers to one or more. Combinations such as "at least one of A, B, or C," "one or more of A, B, or C," "at least one of A, B, and C," "one or more of A, B, and C," and "A, B, C, or any combination thereof" include any combination of A, B, and/or C, and may include multiples of A, multiples of B, or multiples of C. Specifically, combinations such as "at least one of A, B, or C," "one or more of A, B, or C," "at least one of A, B, and C," "one or more of A, B, and C," and "A, B, C, or any combination thereof" may be A only, B only, C only, A and B, A and C, B and C, or A and B and C, where any such combinations may contain one or more member or members of A, B, or C. All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. The words "module," "mechanism," "element," "device," and the like may not be a substitute for the word "means." As such, no claim element is to be construed as a means plus function unless the element is expressly recited using the phrase "means for."

What is claimed is:

1. A communication device, comprising:
a first transmitter;
a second transmitter;
a first antenna, coupled to the first transmitter;
a second antenna, coupled to the second transmitter;
a memory; and
a processor, coupled to the memory, the first transmitter, and the second transmitter, and including instructions that, when executed by the processor cause the processor to: generate a long-range communication signal;
generate a short-range communication signal;
transmit the long-range communication signal from the first transmitter over the first antenna;
transmit the short-range communication signal from the second transmitter over the second antenna;
generate a charging signal configured to deliver electrical power to an external device; and
control at least one of the first transmitter and the second transmitter to selectively transmit the charging signal during allocated transmission intervals such that the charging signal supplies operating power or charging energy to the external device while maintaining cellular network access.

2. The communication device of claim 1, wherein the first transmitter comprises a cellular transmitter.

3. The communication device of claim 1, wherein at least one of the first transmitter and the second transmitter alternates between transmitting the charging signal and at least one of the long-range communication signal and the short range communication signal.

4. The communication device of claim 3, wherein the charging signal is transmitted during idle periods of at least one of the long-range communication signal and the short range communication signal.

5. The communication device of claim 4, wherein the charging signal is transmitted during idle periods of the long-range communication signal.

6. A communication system, comprising:
a communication device, including:

12 a first transmitter;
a second transmitter;
a first antenna, coupled to the first transmitter;
a second antenna, coupled to the second transmitter;
a memory; and
a processor, coupled to the memory, the first transmitter, and the second transmitter, and including instructions that, when executed by the processor cause the processor to:
generate a long-range communication signal, generate a short-range communication signal;
transmit the long-range communication signal from the first transmitter over the first antenna;
transmit the short-range communication signal from the second transmitter over the second antenna;
generate a charging signal configured to deliver electrical power to an external sensor; and
control at least one of the first transmitter and the second transmitter to selectively transmit the charging signal during allocated transmission intervals such that the charging signal supplies operating power or charging energy to the sensor while maintaining cellular network access; and
a sensor operatively coupled to the communication device to receive the charging signal and at least one of the long-range communication signal or the short-range communication signal.

7. The communication system of claim 6, wherein the first transmitter comprises a cellular transmitter.

8. The communication system of claim 7, wherein the sensor is coupled to the communication device through at least one of the first transmitter the second transmitter using the communication signal, the communication signal providing data communication between the sensor and the communication device.

9. The communication system of claim 6, wherein the sensor is coupled to the communication device through the charging signal, the charging signal providing energy to the sensor, the sensor converting the energy provided by the charging signal to a direct current (DC) charging voltage.

10. The communication system of claim 6, wherein at least one of the first transmitter and the second transmitter alternates between transmitting the charging signal and at least one of the long-range communication signal and the short range communication signal.

11. The communication system of claim 10, wherein the charging signal is transmitted during idle periods of at least one of the long-range communication signal and the short range communication signal.

12. The communication system of claim 11, wherein the charging signal is transmitted during idle periods of the long-range communication signal.

13. A method of communication of electronic signals and charging, the method comprising:
generating a long-range communication signal;
generating a short-range communication signal;
transmitting the long-range communication signal from a first transmitter over a first antenna;
transmitting the short-range communication signal from a second transmitter over a second antenna;
generating a charging signal configured to deliver electrical power to an external device; and
selectively transmitting the charging signal during allocated transmission intervals using at least one of the first transmitter and the second transmitter such that the charging signal supplies operating power or charging energy to the external device while maintaining cellular network access.

14. The method of claim 13, wherein the first transmitter comprises a cellular transmitter.

15. The method of claim 13, wherein at least one of the first transmitter and the second transmitter alternate between transmitting the charging signal and at least one of the long-range communication signal and the short range communication signal.

16. The method of claim 15, wherein the charging signal is transmitted during idle periods of at least one of the long-range communication signal and the short range communication signal.

17. The method of claim 16, wherein the charging signal is transmitted during idle periods of the long-range communication signal.

\* \* \* \* \*